(12) United States Patent
Winklbauer

(10) Patent No.: US 9,752,608 B2
(45) Date of Patent: Sep. 5, 2017

(54) MOUNTING SYSTEM

(75) Inventor: Manfred Winklbauer, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 928 days.

(21) Appl. No.: 13/825,059

(22) PCT Filed: Sep. 7, 2011

(86) PCT No.: PCT/EP2011/065449
§ 371 (c)(1),
(2), (4) Date: Jun. 17, 2013

(87) PCT Pub. No.: WO2012/038253
PCT Pub. Date: Mar. 29, 2012

(65) Prior Publication Data
US 2013/0266367 A1    Oct. 10, 2013

(30) Foreign Application Priority Data

Sep. 20, 2010 (DE) .......................... 10 2010 041 048

(51) Int. Cl.
*F16B 21/06* (2006.01)
*B60R 13/02* (2006.01)

(52) U.S. Cl.
CPC .............. *F16B 21/06* (2013.01); *B60R 13/02* (2013.01); *Y10T 403/7039* (2015.01)

(58) Field of Classification Search
CPC ..... F16B 21/06; B60R 13/02; Y10T 403/7039
See application file for complete search history.

(56) References Cited

U.S. PATENT DOCUMENTS

| | | | |
|---|---|---|---|
| 5,106,143 A | 4/1992 | Soeters | |
| 5,377,948 A * | 1/1995 | Suman | ...................... B60R 1/04 248/549 |
| 5,560,572 A * | 10/1996 | Osborn | ............... H05K 7/1421 248/201 |
| 2004/0169390 A1 | 9/2004 | Tiesler et al. | |

(Continued)

FOREIGN PATENT DOCUMENTS

| | | |
|---|---|---|
| CN | 200948769 Y | 9/2007 |
| CN | 101678794 A | 3/2010 |

(Continued)

OTHER PUBLICATIONS

International Search Report and Written Opinion for International Application No. PCT/EP2011/065449 (10 pages).

(Continued)

*Primary Examiner* — Victor MacArthur
(74) *Attorney, Agent, or Firm* — Finnegan, Henderson, Farabow, Garrett & Dunner LLP

(57) ABSTRACT

The invention relates to a mounting system for mounting a component on a support of a motor vehicle. The mounting system comprises a first fixing device for fixing the component without tools in a first region of the component and a second fixing device for fixing the component without tools in a second region of the component. The first fixing device includes a snap closure for fixing the first region of the component in three linearly independent directions, and the second fixing device includes a rail for fixing the second region of the component so as to be displaceable in one direction on the support.

11 Claims, 1 Drawing Sheet

(56) References Cited

U.S. PATENT DOCUMENTS

2010/0133410 A1 6/2010 Gruener et al.
2010/0308192 A1* 12/2010 Spratte ................ B60G 17/019
　　　　　　　　　　　　　　　　　　　　　248/224.8

FOREIGN PATENT DOCUMENTS

| DE | 198 55 095 A1 | 5/2000 |
| DE | 103 57 997 A1 | 9/2004 |
| DE | 10 2006 023948 A1 | 11/2007 |
| JP | H-07164973 A | 6/1995 |

OTHER PUBLICATIONS

International Preliminary Report on Patentability for International Application No. PCT/EP2011/065449 (7 pages).
Search Report for CN 201180055805.0 dated Dec. 17, 2014 (2 pages).

* cited by examiner

MOUNTING SYSTEM

RELATED CASE INFORMATION

This application is a 371 U.S. National Stage Application of International Application No. PCT/EP2011/065449, filed on Sep. 7, 2011, which claims priority to German application no. DE 10 2010 041 048.9, filed on Sep. 20, 2010.

TECHNICAL FIELD

The invention relates to a mounting system for mounting a component to a support of a motor vehicle, comprising a first fixing device for fixing without tools the component in a first region of the component and a second fixing device for fixing without tools the component in a second region of the component.

STATE OF THE ART

Components such as, e.g., a center console, are usually mounted in a motor vehicle interior using screws. In addition, rotary closures are also used which, in part, allow for tool-free attachment of the center console in the motor vehicle. Such a center console is typically attached in a front region to the instrument panel of the vehicle and in a rear region directly or via a holder to the body shell of the vehicle.

Tools and materials are required for such a mounting, and the assembly of the center consoles requires assembly time, which results in an increase in the manufacturing time for the vehicle and thus in a reduced efficiency in manufacturing the vehicle.

When constructing such a center console, it is important that the screws are arranged and designed such that the screw heads can be covered and, even after installation of the center console, can be unscrewed again during maintenance of the motor vehicle. Such framework conditions considerably reduce the freedom of design of the center console.

U.S. Pat. No. 5,106,143 describes a floor-mounted center console which can be mounted to the floor of a vehicle by a snap connection. In a first region, the center console is attached to the floor by a first fixing device without using a tool. The first fixing device in this case consists of a tongue-and-groove system that retains the center console in the front region.

For the rear region of the center console, this document shows a snap connection by which the center console is held in a position such that the first fixing device acts on the center console.

By releasing the snap connection, the center console can be pivoted such that it can be detached and removed from the first fixing device.

A disadvantage of the design described in U.S. Pat. No. 5,106,143 is that owing to manufacturing tolerances and thermal expansions, the center console cannot be mounted exactly to the vehicle. On the contrary, the fixing devices must allow a certain range of tolerance (leeway) for the center console such that the center console can move, which results in unsatisfactory mounting.

Another disadvantage of the design from the state of the art is that when being assembled, the console must be inserted very accurately into the first fixing device so that this device can perform its function. Since the fixing device is hidden by the console itself, it is often difficult for the assembler to accurately insert the console into the fixing device. The result is that it often takes several attempts to mount the console to the vehicle, which prolongs the average assembly time.

DESCRIPTION OF THE INVENTION

The object of the present invention is to improve a mounting system of the aforementioned technical field to the effect that an exact mounting of a component to a support of a motor vehicle is possible, which can moreover be easily used.

The solution to this object is evident from the subject matter of claim 1.

According to the invention, a mounting system for mounting a component to a support of a motor vehicle, which comprises a first fixing device for fixing without tools the component in a first region of the component and a second fixing device for fixing without tools the component in a second region of the component, is characterized in that the first fixing device has a snap closure such that the component can be fixed in the first region in three linearly independent directions, and the second fixing device has a rail such that in the second region the component can be fixed to the support so as to be displaceable in one direction.

Due to the snap closure of the first fixing device, the assembler immediately receives haptic and/or acoustic and/or optical feedback as to the correct fit of the fixing device when mounting the component to the support. The snap closure enables tool-free and fast mounting of the component to the support. Therefore, screwing the component to the support is no longer necessary such that, on the one hand, the assembly time is considerably reduced and, on the other hand, the freedom of design of the component is increased.

Due to the second fixing device being configured with a rail such that in the second region the component can be fixed to the support so as to be displaceable in one direction, manufacturing tolerances and thermal expansion or contraction in this direction can be compensated easily without the precise fixing of the component in the first region being detrimentally affected by this. Moreover, it is possible that the component is initially fixed in the second region in two dimensions via the rail such that the mounting of the component in the first region is also facilitated. Thus, an incorrect assembly can largely be prevented, as a result of which the average assembly time of the component to the support is significantly reduced.

Preferably, the first fixing device is provided in a front region of a center console in order to there effect precise fixation of the center console to an instrument panel or the body shell of the vehicle so that gap dimensions and attachment accuracy also meet the high quality requirements typical of the premium vehicle segment. The rear region of the center console is not that much in the field of vision of the vehicle occupants, and therefore a compensation of thermal length changes or manufacturing tolerances is less conspicuous in this region of the component.

It is advantageous that a first assembly direction is defined for the first fixing device and that a second assembly direction is defined for the second fixing device, with the first assembly direction extending parallel to the second assembly direction. It is further preferred that the second fixing device is configured to fix the component in two directions linearly independent of the second assembly direction.

Since the first and second fixing devices have parallel assembly directions, it is particularly easy to assemble the component onto the support. The term "assembly direction"

is understood to mean a direction in which the component must be moved relative to the support in order to be mounted to said support. In particular, the rail of the second fixing device can thus extend preferably parallel to the insertion direction of the snap closure of the first fixing device. Guided by the rail of the second fixing device, the component can then be inserted into the first fixing device with high reliability and at high speed.

That the second fixing device is preferably configured to fix the component in two directions linearly independent of the second assembly direction is understood to mean that the component can only be displaced on the rail in the direction of the orientation of said rail. A transversal movement of the component perpendicular to the orientation of the rail is to be prevented by the second fixing device, and a tilting movement perpendicular to the orientation of the rail is preferably also prevented. Thus, a high degree of mounting quality is achieved, with a certain flexibility in respect of the thermal expansion or contraction of the component, e.g. the center console, being ensured at the same time.

In a preferred embodiment, the snap closure has a male member and a female member configured to interact with the male member such that the male member can be centered and fixed in the female member.

In particular, the male member may be a ball pin that can snap into a ball socket, which is a preferred form of the female member. In a suitable embodiment of the ball socket and its environment, the ball pin is guided directly into the ball socket and is thus centered. Following snapping in, the region of the component provided with the first fixing device, i.e. in particular the ball pin and the ball socket, is mounted in all three spatial directions.

As an alternative, it is possible to provide other male members, e.g. plug-shaped or pin-shaped ones, and corresponding female counterparts as a snap closure.

In a further preferred embodiment, the male member is provided on the component or the support, in particular it is realized integrally therewith. Thus, it is particularly preferred that the male member be molded directly onto the component or the support such that a possible mounting step between the male member and the component or the support does not have to be carried out during the assembly of the component onto the support. In addition, it is possible that the male member be mounted to the component or the support as an individual part.

The rail advantageously interacts with a guide designed as a T-guide, dovetail guide or circular guide. Such a guide facilitates the fixation of the component to the support in the second region by achieving a defined interaction with the rail. The guide for the rail and consequently also the design of the rail and the corresponding guide are selected dependent on the forces that will probably act between the component and the support when the component is used. Guides that can also absorb tilting forces well, e.g. the T-guide or the dovetail guide, are particularly preferred.

The second fixing device preferably comprises a securing mechanism, in particular a securing pin configured to limit a movement of the component relative to the support in at least one direction, in particular to prevent the component from being torn off of the support in case of an accident.

The second fixing device can thus act as an additional security measure should the first fixing device not withstand a particularly strong force acting upon the component. A securing pin is a particularly simple realization of such a securing mechanism. The securing mechanism should allow the movement of the component relative to the support within the scope of the variables usually to be expected and should only intervene when there is a movement between the component and the support that is no longer tolerable. In particular, it can thus be prevented that the component penetrates the passenger compartment in case of an accident of the motor vehicle, for example a rear-end collision, thereby posing a risk to the vehicle occupants.

In a preferred embodiment, the component can be mounted to the support such that it can be removed from the support in a tool-free manner, i.e. without using tools. Since the component can be removed from the support without using tools, disassembly can be carried out faster and thus more efficiently during maintenance of the motor vehicle. For this purpose, the snap closure can be particularly configured such that it can be opened when force is exerted in a targeted manner, in particular after unlocking, such that the component can be detached from the support without using a tool.

It is advantageous when the support is a body shell of a motor vehicle and/or an instrument panel of the motor vehicle, wherein the component can be mounted in particular in the first region to the instrument panel and in the second region to the body shell. The term "support" can thus be understood to also mean various parts of the motor vehicle that are connected with each other at least indirectly.

In a preferred embodiment, the first fixing device comprises a ball pin and a corresponding receptacle into which the ball pin can be inserted in a first assembly direction, with the second fixing device comprising a rail and a corresponding guide such that the rail can be displaced in the guide along the first assembly direction, with the second fixing device fixing the component in two directions linearly independent of the assembly direction.

The ball pin can be moved, i.e. rotated, in the receptacle like a ball joint as long as the second fixing device does not engage. The receptacle can be realized, for example, by an elastic ring through which the ball head of the ball pin can be guided and is thus elastically held. In addition, for example, several notches that can hold the ball head of the ball pin on the circumference thereof are also suitable receptacles.

A component as according to the invention is designed for being mounted to a support of a motor vehicle by a mounting system according to the above description. In particular, the component thus comprises respectively one part of the first fixing device and one part of the second fixing device, with the corresponding counterparts thereof being provided on the support.

The first fixing device is preferably configured like a "snaplock" consisting of a hard ball pin on a long pin mounted to or molded onto the component, and interacting with a counterpart provided on the support in the form of an elastic coupling for quick installation. The elastic coupling can preferably be based on a simple elastic snap connection. Within the coupling, a ball socket is preferably formed into which the ball pin as the counterpart can snap.

It is possible to provide a plurality of fixing devices. Both a plurality of first fixing devices and a plurality of second fixing devices can be provided.

However, the term "snap connection" is understood to also mean configurations that are referred to as "clip closure". In this case, an elastic configuration of the female member is not necessary, but only a clip opening. With regard to the second fixation, it is further possible to additionally provide compensation elements compensating a tolerance for the interaction between the rail and the corresponding element, i.e. particularly the guide.

Apart from a center console, other components can also be mounted in the motor vehicle or mounted to the motor vehicle from outside by the mounting system according to the invention. These include, for example, storage compartments, trim in the interior and such on the exterior of the vehicle.

Further advantages and features of the invention are evident from the following description of the figures and the entirety of the claims.

WAYS OF IMPLEMENTING THE INVENTION

Figure 1:
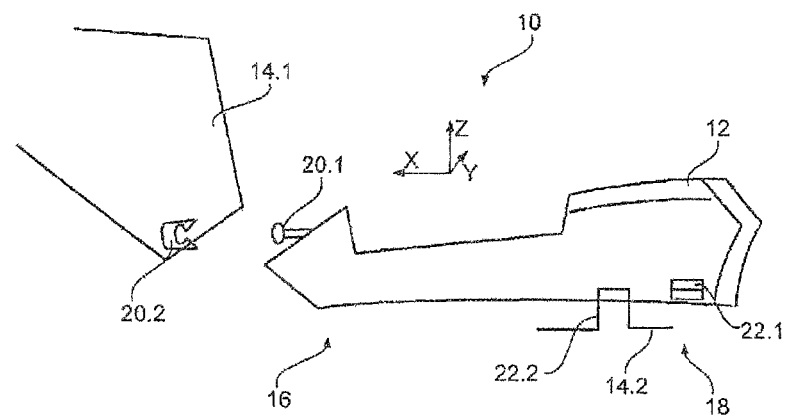
FIG. 1 shows a schematic side view of a preferred mounting system between a center console, a vehicle body shell and an instrument panel.

FIG. 1 shows a mounting system 10 for mounting a center console 12 to an instrument panel 14.1 and a body shell 14.2 of a motor vehicle. FIG. 1 is a side view of the mounting system 10, with an assembly direction X of the center console 12 extending from right to left in FIG. 1. The direction Z extends in FIG. 1 from the bottom to the top and is therefore perpendicular to the assembly direction X.

In a first region 16, a ball pin 20.1 is provided on the center console 12, which is configured to interact with a corresponding receptacle 20.2 on the instrument panel 14.1. By displacing the center console 12 in the assembly direction X, the ball pin 20.1 arrives in the receptacle 20.2 and is then fixed therein in the X-, Y- and Z-directions. The Y-direction extends perpendicularly to the drawing plane of FIG. 1.

The ball pin 20.1 is configured as a pin that is provided with a ball head at its end. The ball head is configured to interact with the receptacle 20.2. The receptacle 20.2 is configured, for example, as an elastic ring through which the ball head can be elastically guided. A plurality of notches provided along the circumference of the receptacle 20.2 can also interact with the ball head of the ball pin 20.1, thereby holding it.

In a second region 18 of the center console 12 there is a rail 22.1 that is configured as a T-rail in the preferred embodiment. The rail 22.1 is configured to interact with a guide 22.2 that is fixedly attached to the body shell 14.2 of the vehicle. By displacing the center console 12 along the assembly direction X, the rail 22.1 can be inserted into the guide 22.2. In the inserted state, the guide 22.2 allows the rail 22.1 to be displaced along the assembly direction X. Moreover, the center console 12 is held in the Z-direction and the Y-direction also in the second region 18.

Thus, it is possible that even manufacturing tolerances of the center console 12 do not present a bar to a clearance-free mounting of the center console 12 to the instrument panel 14.1 and the body shell 14.2. Moreover, the configuration of the rail 22.1 and that of the guide 22.2 allow the center console 12 to thermally expand and contract without affecting the precise mounting of the center console 12 to the instrument panel 14.1.

Figure 2:
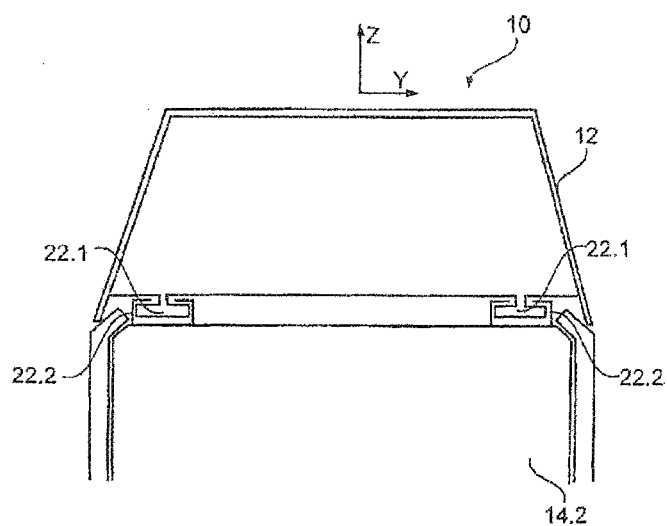
FIG. 2 shows a sectional view of the mounting system from FIG. 1 in the second region where the second fixing device is provided.

FIG. 2 is a cross-sectional view of the mounting system 10 in the second region 18, i.e. at the level of the second fixing device which in the embodiment shown is formed by the rail 22.1 in connection with the guide 22.2 on the body shell 14.2 of the vehicle.

In FIG. 2, the Y- and Z-directions are drawn, in which the second fixing device in the form of the rail 22.1 and the guide 22.2 mounts the center console 12 to the body shell 14.2.

As an alternative to the T-shape of the rail 22.1, a dovetail guide or a circular guide or a differently designed guide can also be provided here. In particular with a circular guide it is preferred, however, that at least two rails and corresponding guides be provided in order to also bear a reliable mounting with respect to an exertion of forces on the center console 12 in the Y-direction.

The invention claimed is:

1. A mounting system for an interior of a motor vehicle, the mounting system comprising:
   an interior vehicle component that extends horizontally in a lengthwise direction between a first region of the interior component and a second region of the interior component, wherein the interior component has a bottom relative to the lengthwise direction;
   a first support mounted to the motor vehicle and having a first snap closure part; and
   a second support mounted to the motor vehicle and having a first guide part;
   wherein the interior vehicle component further includes:
      a second snap closure part that is attached to the interior vehicle component in the first region and that fixedly interacts with the first snap closure part upon moving the interior vehicle component in a first assembly direction,
         wherein the second snap closure part is attached to a side of the interior vehicle component that is perpendicular to the first assembly direction, and
         wherein the first and second snap closure parts function together, when fixedly interacting, to fix the first region of the interior vehicle component to the first support in three linearly independent directions; and
      a second guide part attached to the interior vehicle component in the second region and that fixedly interacts with the first guide part when the interior vehicle component moves in the second assembly direction,
         wherein the second guide part is mounted on the bottom of the interior vehicle component and mounted in the second region of the interior vehicle component, and
         wherein the first and second guide parts function together, when fixedly interacting, to fix the second region of the interior vehicle component to the second support in two directions linearly independent of the first assembly direction, and
   wherein the first assembly direction extends parallel to the second assembly direction; and
   wherein at least one of the first and second guide parts is a rail and the other guide part is a guide element that is guided in the second assembly direction by the rail.

2. The mounting system according to claim 1, wherein at least one of the first and second snap closure parts is a male member and the other snap closure part is a female member configured to interact with the male member, such that the male member can be centered and fixed in the female member.

3. The mounting system according to claim 2, wherein the second snap closure part is the male member.

4. The mounting system according to claim 1, wherein the guide element is configured as a T-guide, dovetail guide or circular guide that is guided by the rail.

5. The mounting system according to claim 1, wherein the interior vehicle component is mountable to the first support or the second support for removal from the first support or the second support without using tools.

6. The mounting system according to claim 1, wherein the second support is part of a body shell of the motor vehicle and the second support is part of an instrument panel of the motor vehicle, such that the first region of the motor vehicle component is mountable to the instrument panel and the bottom of the component is mountable to the body shell.

7. The mounting system according to claim 1, wherein at least one of the first and second snap closure part includes a ball pin and the other snap closure part includes a corresponding receptacle into which the ball pin can be inserted in the first assembly direction.

8. The mounting system according to claim 1, wherein the rail extends in the second region in the second assembly direction.

9. The mounting system according claim 1, wherein a location of the second snap closure part is separated by a lengthwise distance of the interior vehicle component from a location of the second guide part.

10. The mounting system according to claim 1, wherein the second support includes a third guide part, and the interior vehicle component further includes:
 a fourth guide part attached to the interior vehicle component in the second region and that fixedly interacts with the third guide part when the interior vehicle component moves in the second assembly direction,
  wherein the fourth guide part is mounted on the bottom of the interior vehicle component and mounted in the second region of the interior vehicle component, and
  wherein when the third guide part and the fourth guide part fixedly interact, the third and fourth guide parts function together to fix the second region of the interior vehicle component to the second support.

11. The mounting system according to claim 10, wherein at least one of the third and fourth guide parts is a rail and the other guide part is a guide element that is guided in the second assembly direction by the rail.

\* \* \* \* \*